(12) United States Patent
Lee et al.

(10) Patent No.: US 10,360,440 B2
(45) Date of Patent: Jul. 23, 2019

(54) MOBILE TERMINAL AND CONTROL METHOD THEREOF

(71) Applicant: LG ELECTRONICS INC., Seoul (KR)

(72) Inventors: Ilyong Lee, Seoul (KR); Joomin Kim, Seoul (KR); Eunsil Lee, Seoul (KR); Seojeong Chang, Seoul (KR); Jaehyun Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 15/519,102

(22) PCT Filed: Jul. 10, 2015

(86) PCT No.: PCT/KR2015/007174
§ 371 (c)(1),
(2) Date: Apr. 13, 2017

(87) PCT Pub. No.: WO2016/093459
PCT Pub. Date: Jun. 16, 2016

(65) Prior Publication Data
US 2017/0243054 A1    Aug. 24, 2017

(30) Foreign Application Priority Data

Dec. 11, 2014   (KR) ........................ 10-2014-0178773

(51) Int. Cl.
| G06F 21/00 | (2013.01) |
| G06K 9/00 | (2006.01) |
| G06F 3/0488 | (2013.01) |
| G06F 21/32 | (2013.01) |
| G06F 3/0484 | (2013.01) |
| H04W 12/06 | (2009.01) |
| G06K 9/22 | (2006.01) |

(Continued)

(52) U.S. Cl.
CPC ....... *G06K 9/00288* (2013.01); *G06F 3/0488* (2013.01); *G06F 3/04847* (2013.01);
(Continued)

(58) Field of Classification Search
CPC .......... G06K 9/00288; G06K 9/00208; G06K 9/00281; G06K 9/00604; G06K 9/228;
(Continued)

(56) References Cited

U.S. PATENT DOCUMENTS 8,254,647 B1 * 8/2012 Nechyba ............ G06K 9/00248
382/118
9,153,031 B2 * 10/2015 El-Saban ........... G06K 9/00228
(Continued)

FOREIGN PATENT DOCUMENTS

KR    10-2009-0122572 A    12/2009

*Primary Examiner* — Ghodrat Jamshidi
(74) *Attorney, Agent, or Firm* — Birch, Stewart, Kolasch & Birch, LLP

(57) ABSTRACT

Disclosed is a mobile terminal for providing screen information for face recognition includes: a camera unit configured to receive a face image; a display unit configured to output screen information for face recognition; and a control unit configure to, when face images captured in different postures are recognized, provide notification information indicating that the faces have been recognized, wherein the screen information for face recognition includes a plurality of graphic objects denoting face images of different postures, and when there is a posture identical to a posture of a face image received through the camera unit, among the postures denoted by the plurality of graphic objects, the control unit makes the graphic object denoting the posture identical to the posture of the face image received through the camera unit disappear from the screen information for face recognition.

20 Claims, 16 Drawing Sheets

(51) Int. Cl.
*G09B 5/02* (2006.01)
*H04L 29/06* (2006.01)
*H04W 88/02* (2009.01)

(52) U.S. Cl.
CPC ......... *G06F 21/32* (2013.01); *G06K 9/00208* (2013.01); *G06K 9/00281* (2013.01); *G06K 9/00604* (2013.01); *G06K 9/228* (2013.01); *G09B 5/02* (2013.01); *H04W 12/06* (2013.01); *G06F 2221/2117* (2013.01); *H04L 63/0861* (2013.01); *H04W 88/02* (2013.01)

(58) Field of Classification Search
CPC .... G06F 3/04847; G06F 3/0488; G06F 21/32; G06F 2221/2117; G09B 5/02; H04W 12/06; H04W 88/02; H04L 63/0861
See application file for complete search history.

(56) References Cited

U.S. PATENT DOCUMENTS

| | | | |
|---|---|---|---|
| 9,754,094 B2* | 9/2017 | Fujiwara | G06F 21/32 |
| 2007/0189583 A1* | 8/2007 | Shimada | G06K 9/00255 382/118 |
| 2010/0013945 A1* | 1/2010 | Hada | G03B 17/40 348/222.1 |
| 2010/0060809 A1* | 3/2010 | Okuda | G03B 21/006 349/1 |
| 2010/0266206 A1* | 10/2010 | Jo | G06K 9/00261 382/190 |
| 2011/0216209 A1 | 9/2011 | Fredlund et al. | |
| 2012/0172085 A1* | 7/2012 | Vuppu | G06F 1/3231 455/556.1 |
| 2013/0129145 A1* | 5/2013 | Ye | G06K 9/00221 382/103 |
| 2013/0137483 A1* | 5/2013 | Senoo | G09G 5/00 455/556.1 |
| 2014/0118520 A1* | 5/2014 | Slaby | G06K 9/00926 348/77 |
| 2014/0313307 A1* | 10/2014 | Oh | G06F 3/0416 348/78 |
| 2015/0084859 A1* | 3/2015 | Itzhaik | G06F 3/017 345/156 |
| 2016/0004376 A1* | 1/2016 | Mitsunaga | G06F 1/1684 345/173 |
| 2016/0300099 A1* | 10/2016 | Xiaolu | G06F 3/012 |

* cited by examiner

[Fig. 1a]
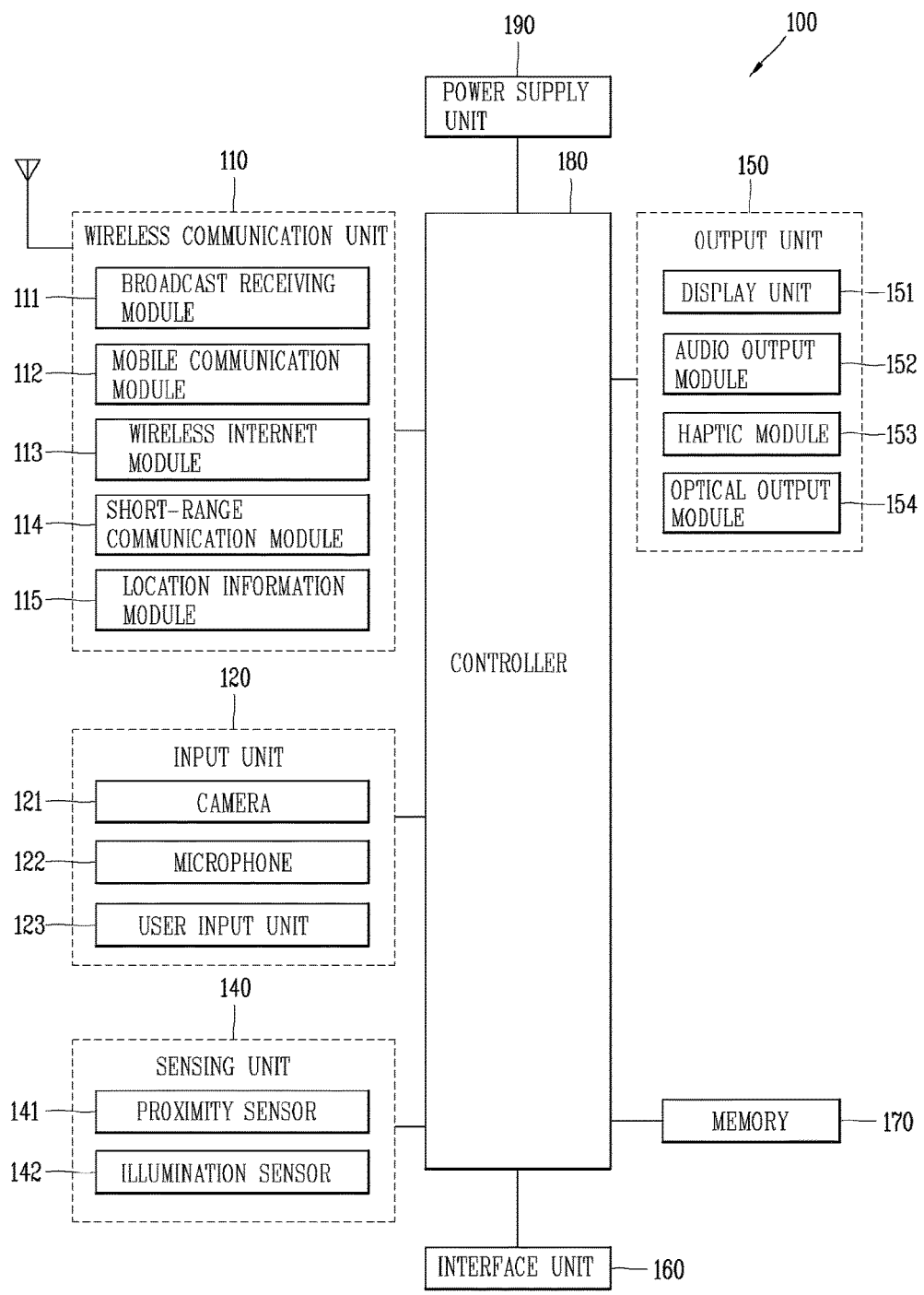

[Fig. 1b]
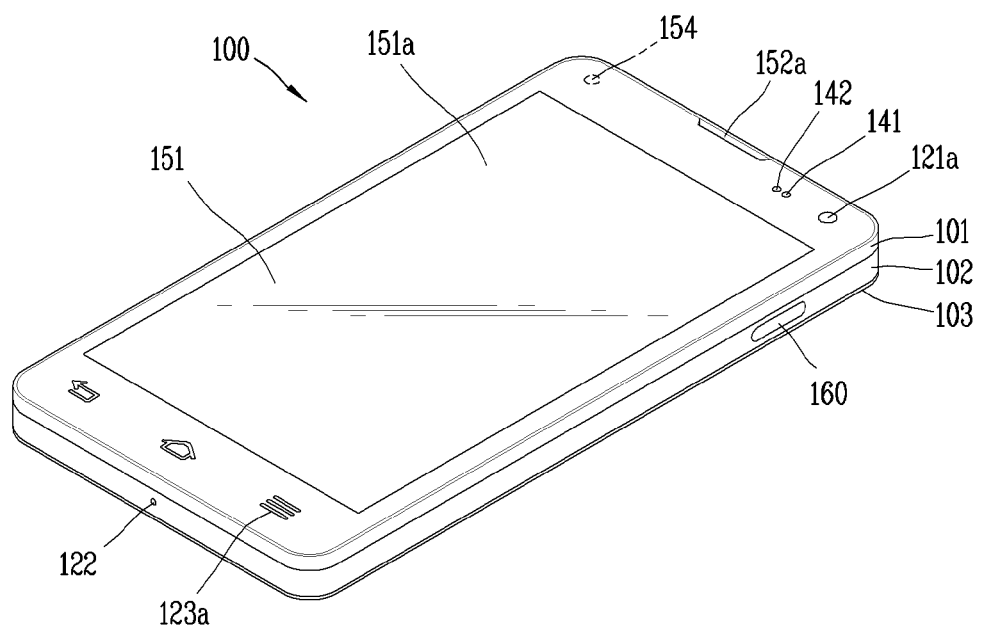
[Fig. 1c]
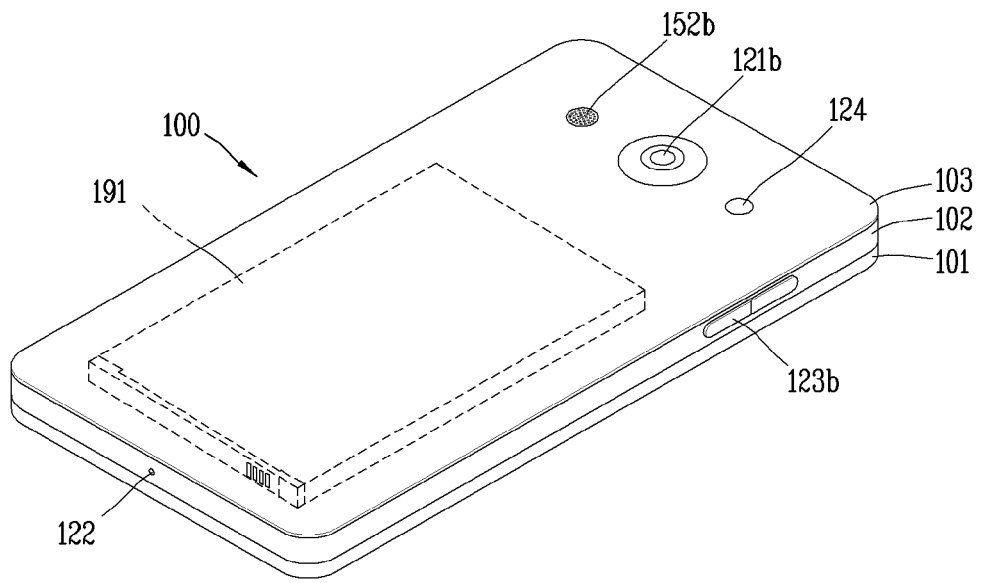

[Fig. 2]
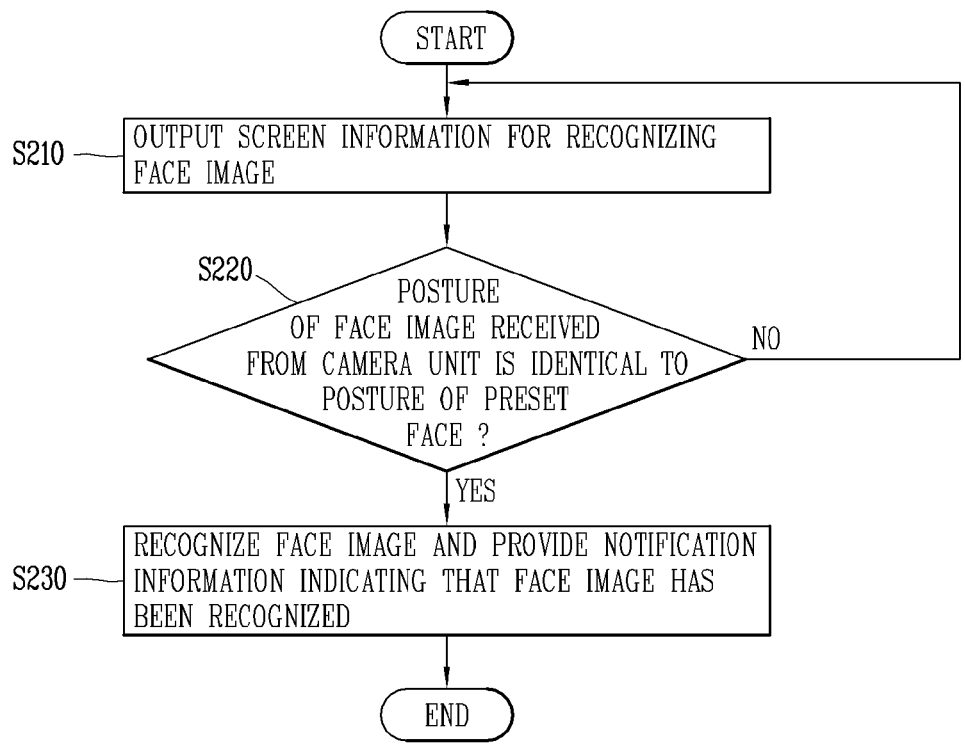

[Fig. 3]
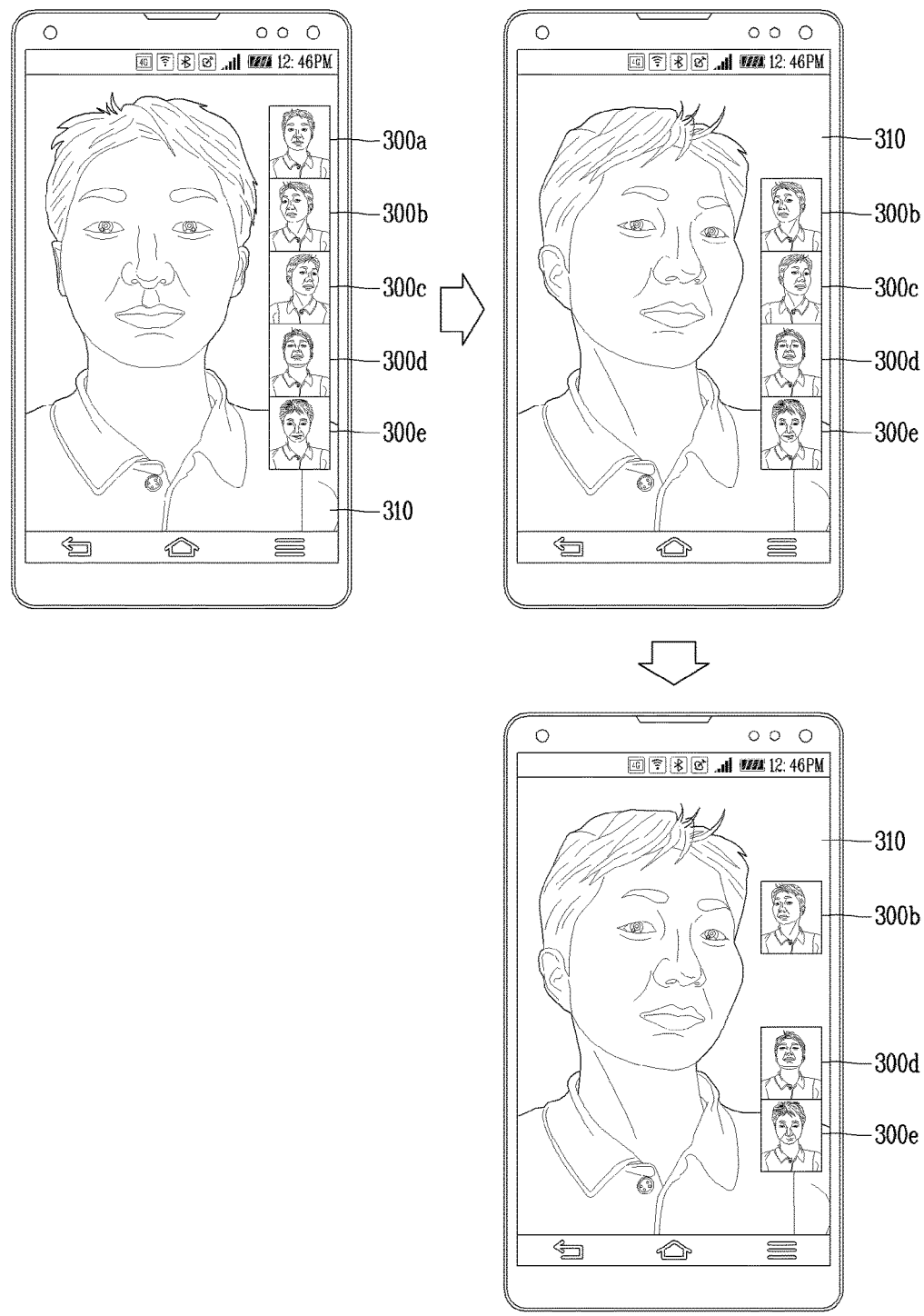

[Fig. 4a]
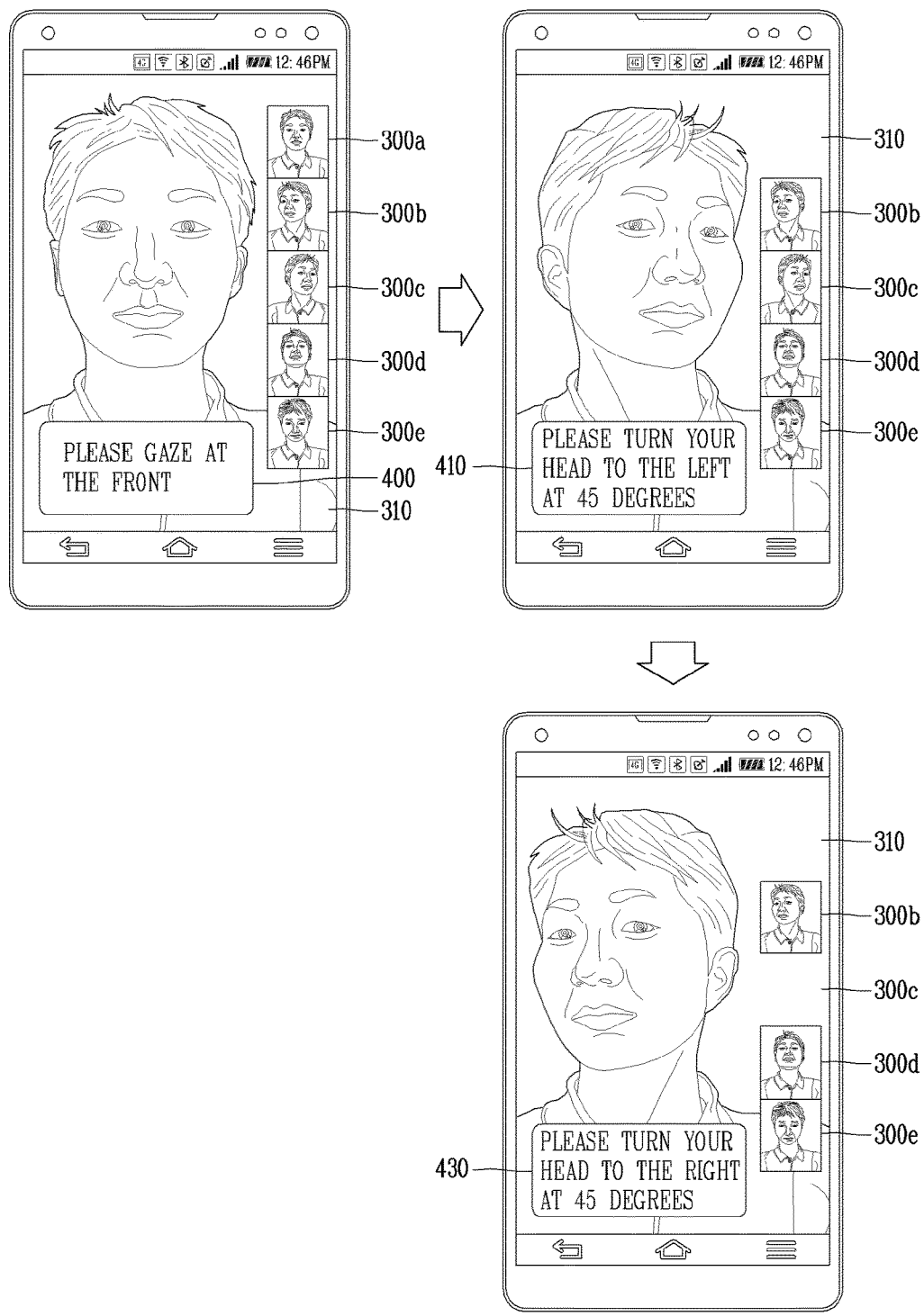

[Fig. 4b]
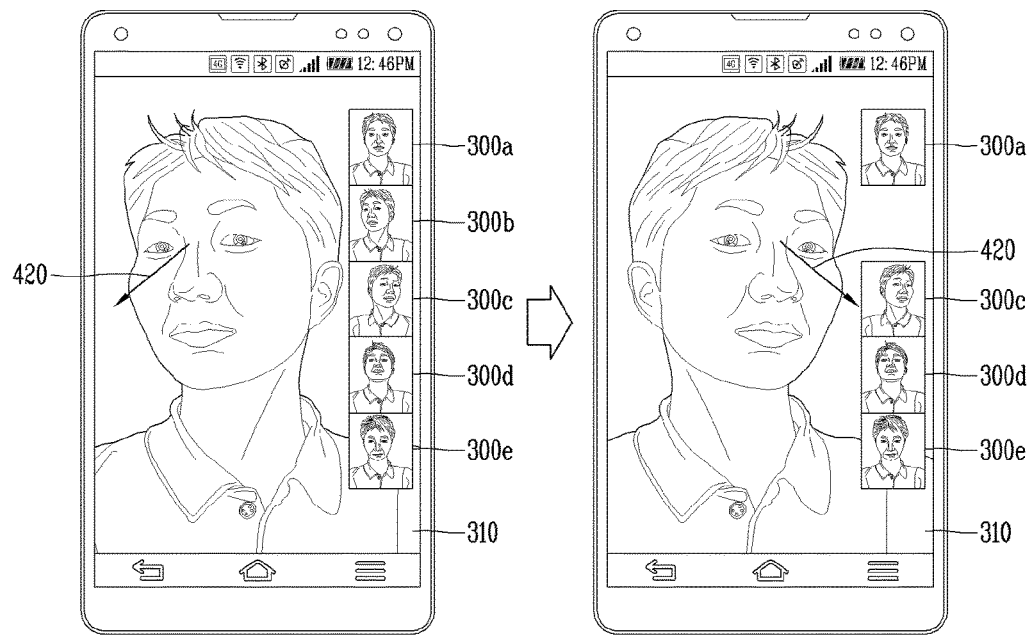

[Fig. 5a]
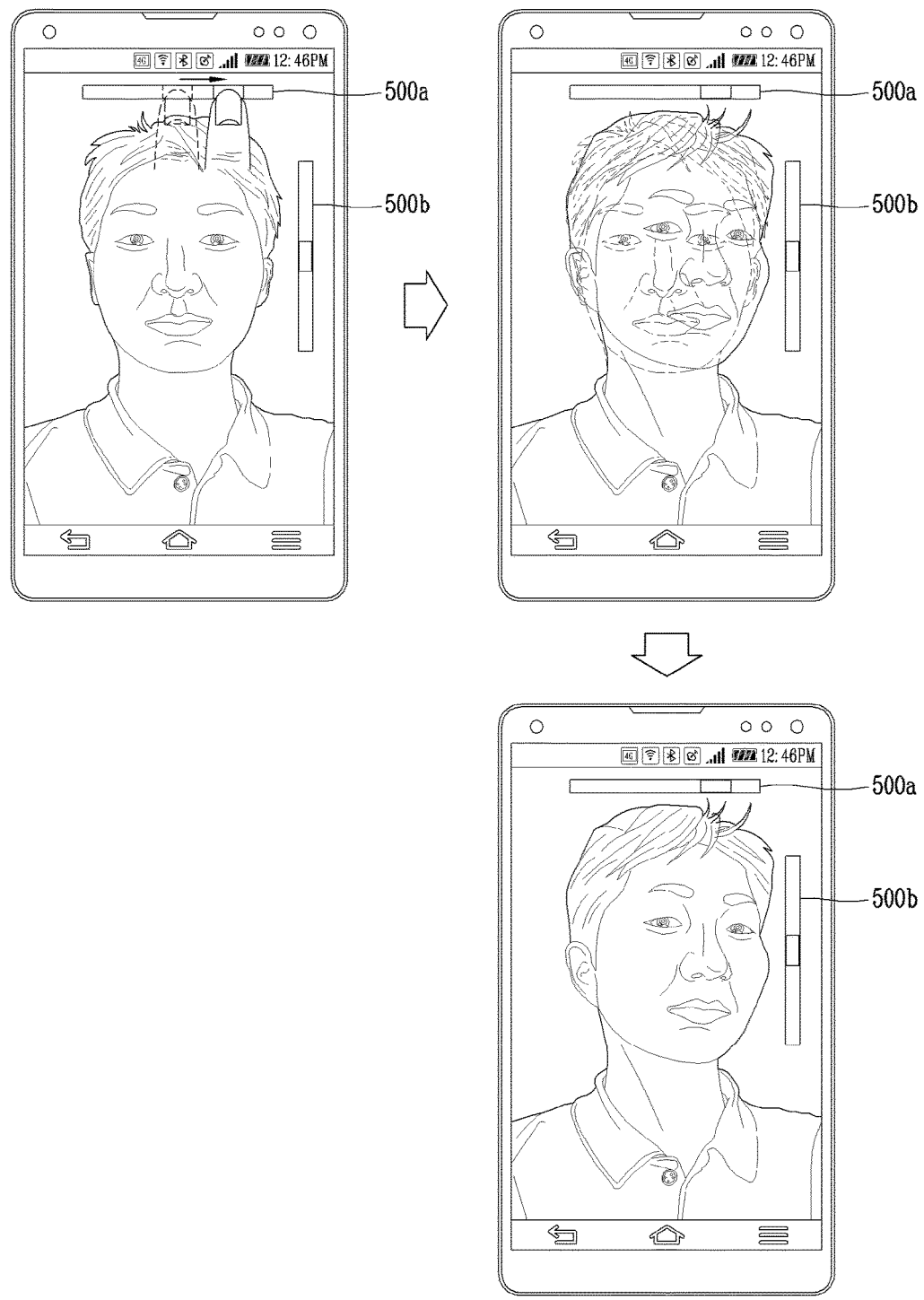

[Fig. 5b]
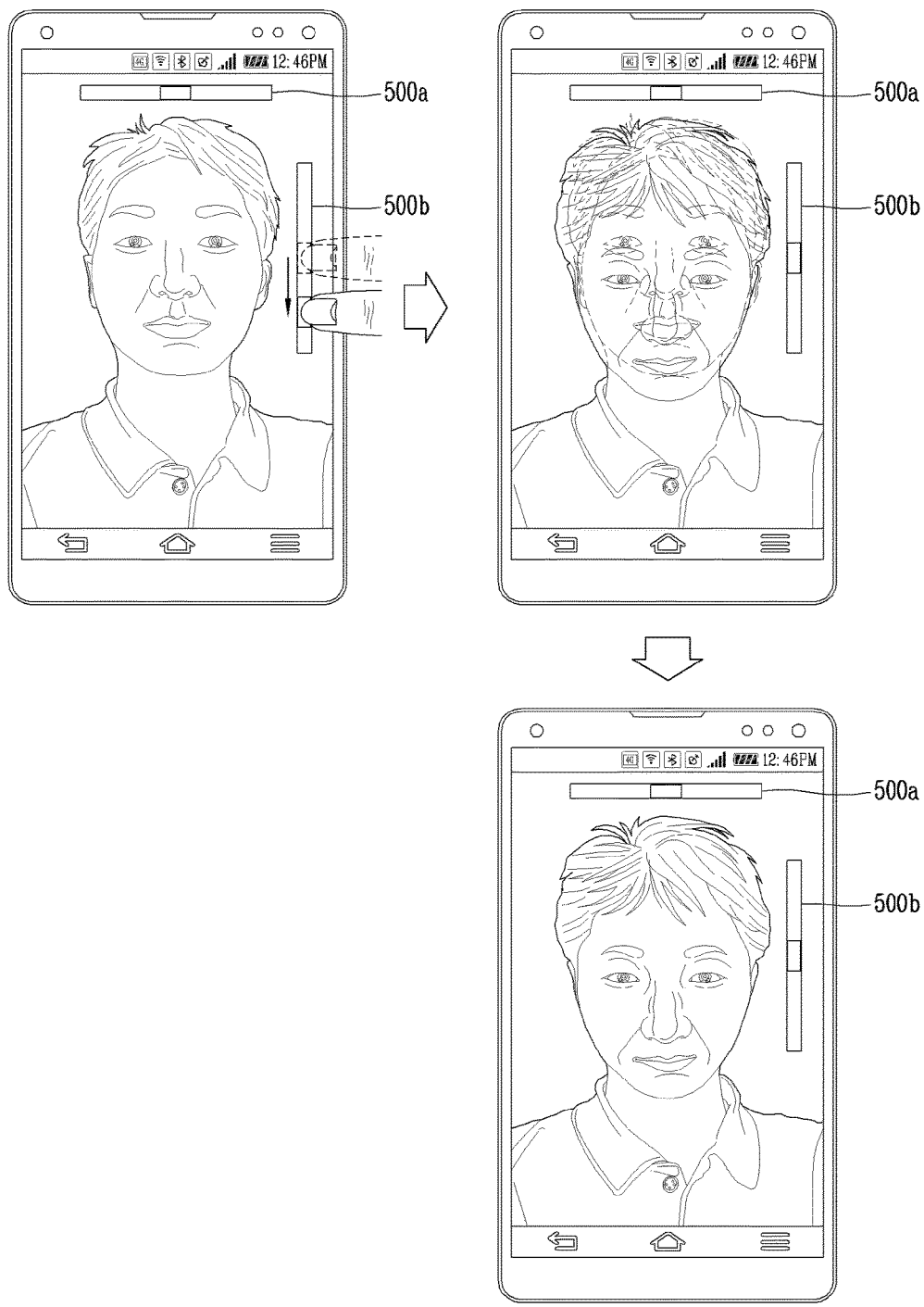

[Fig. 6]
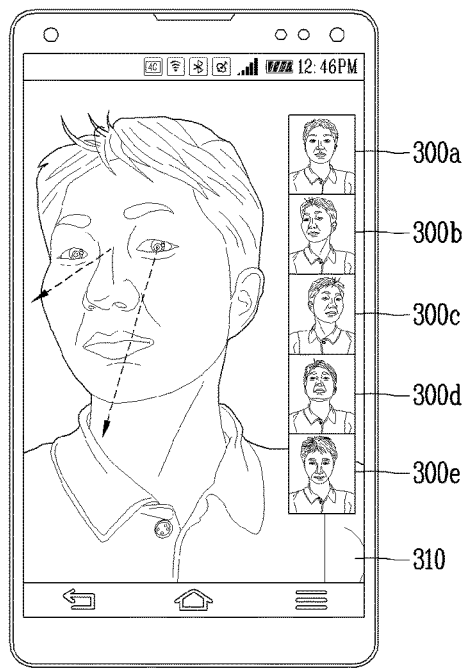
[Fig. 7a]
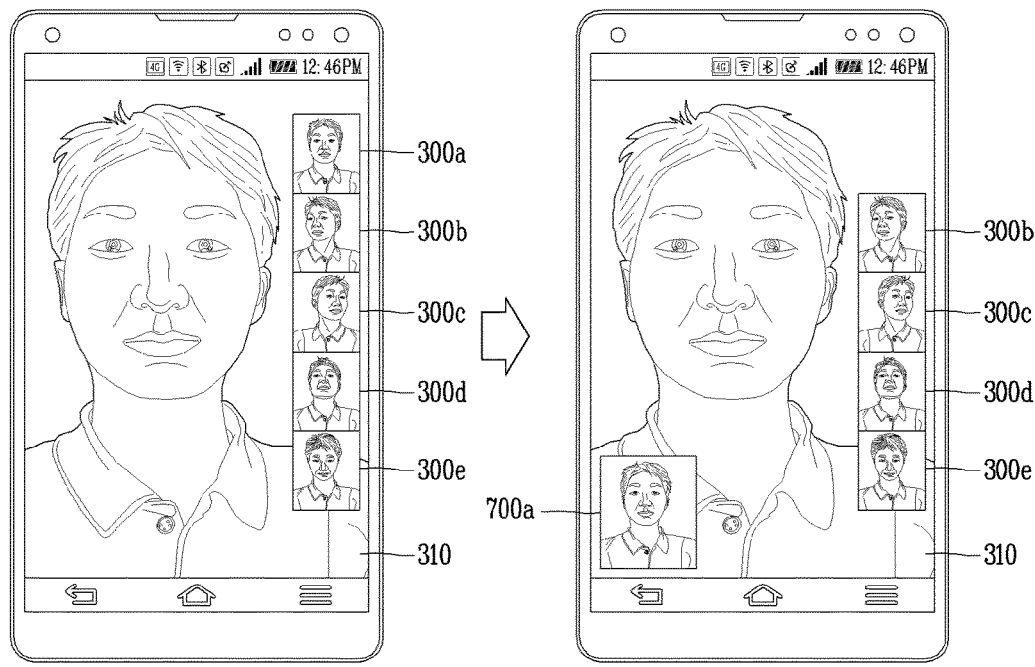

[Fig. 7b]
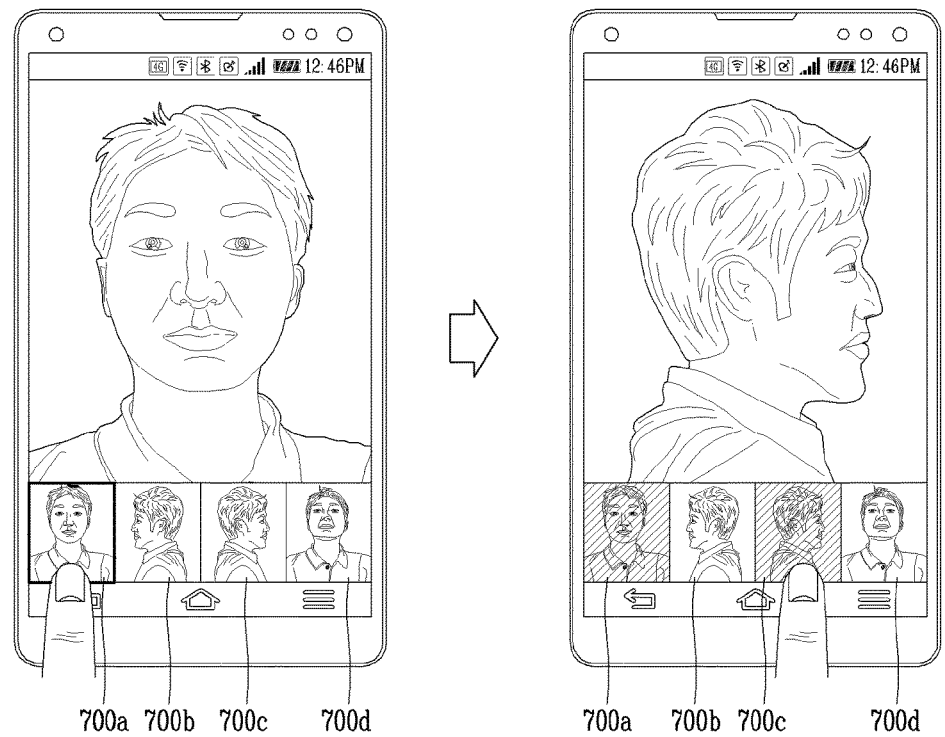
[Fig. 7c]
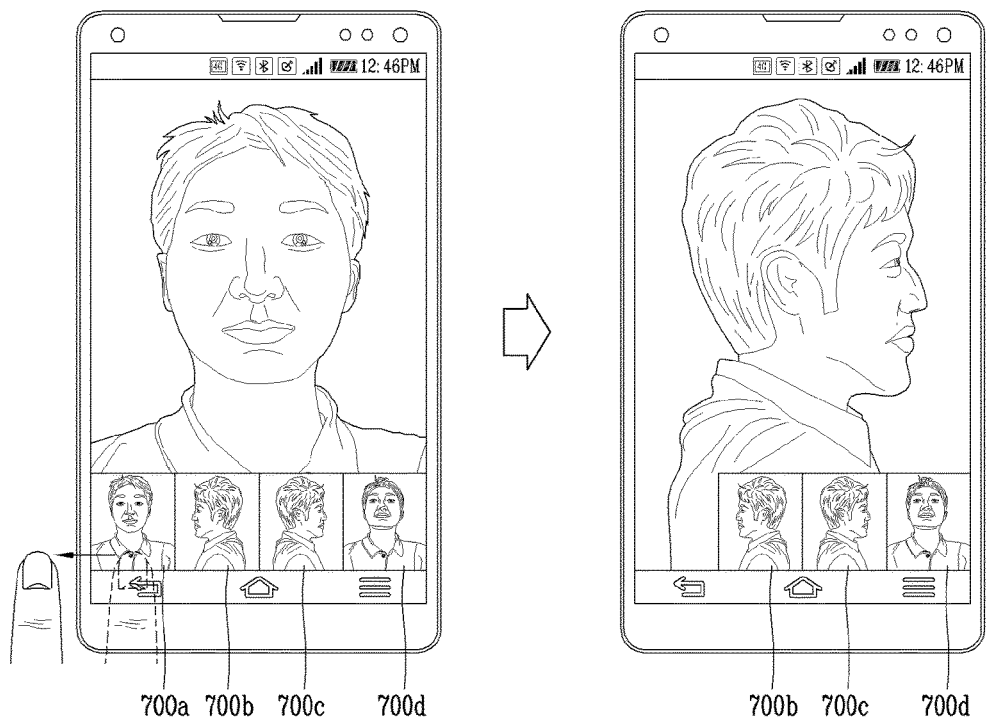

[Fig. 8a]
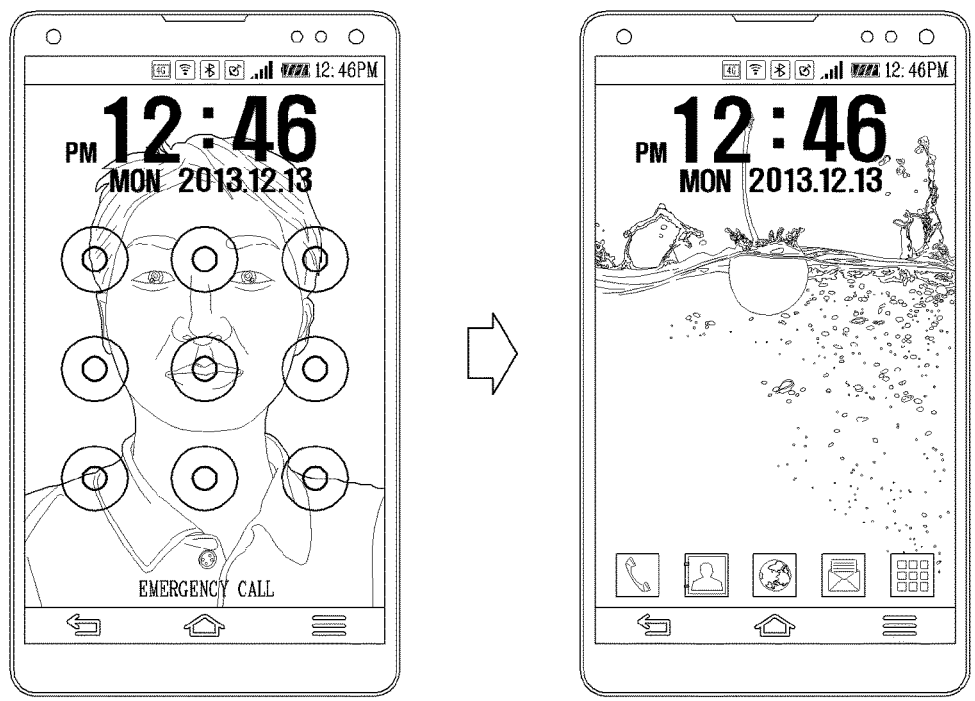

[Fig. 8b]
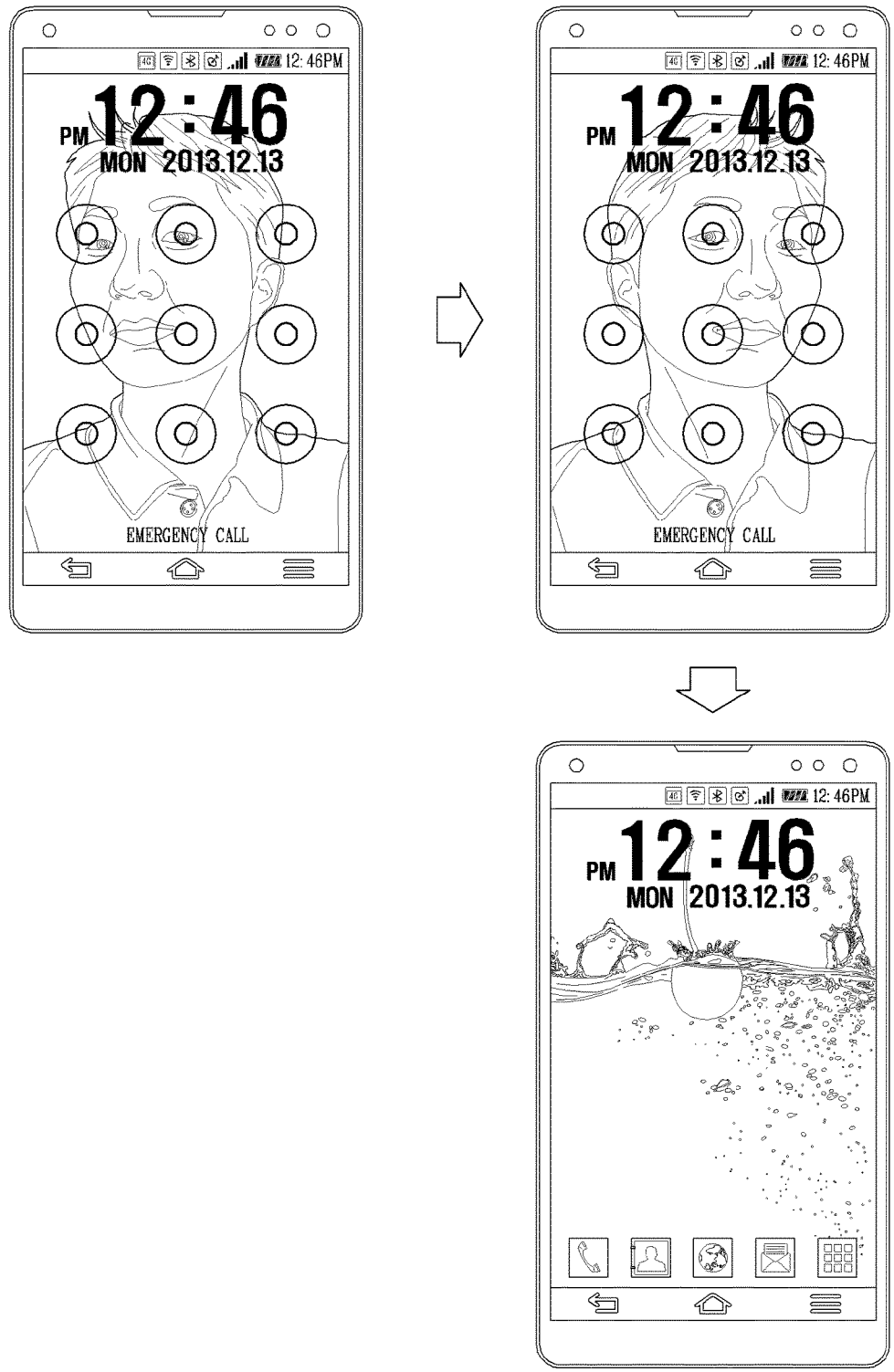

[Fig. 9a]
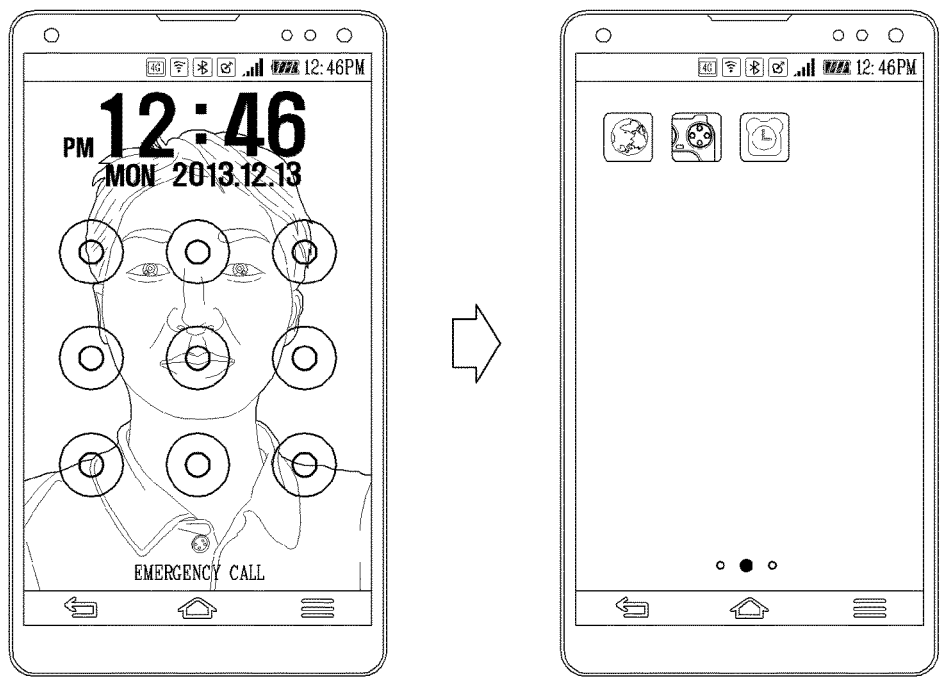
[Fig. 9b]
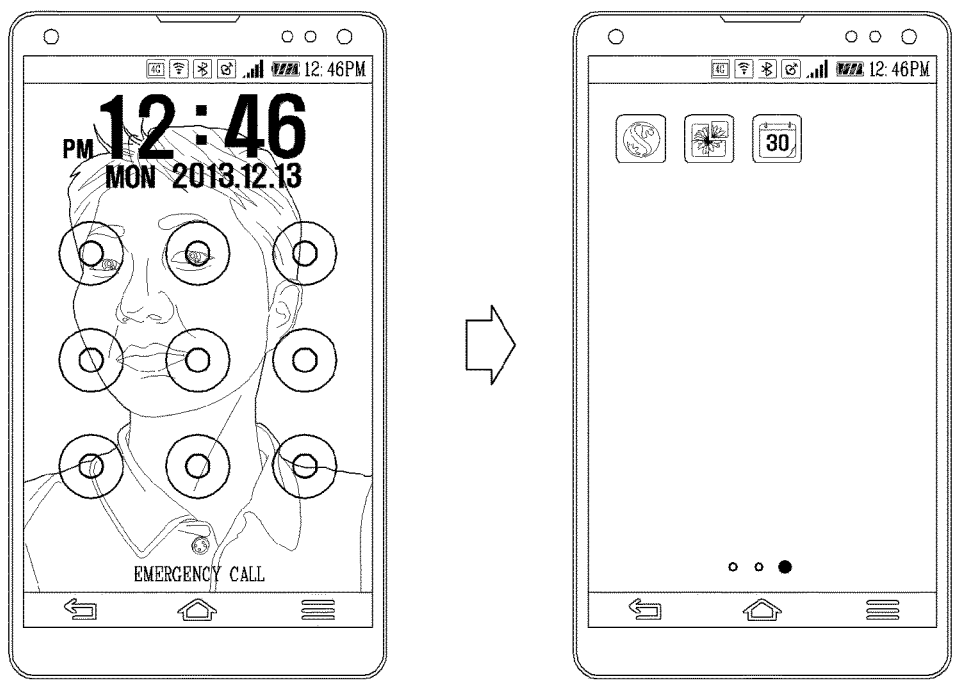

[Fig. 10a]
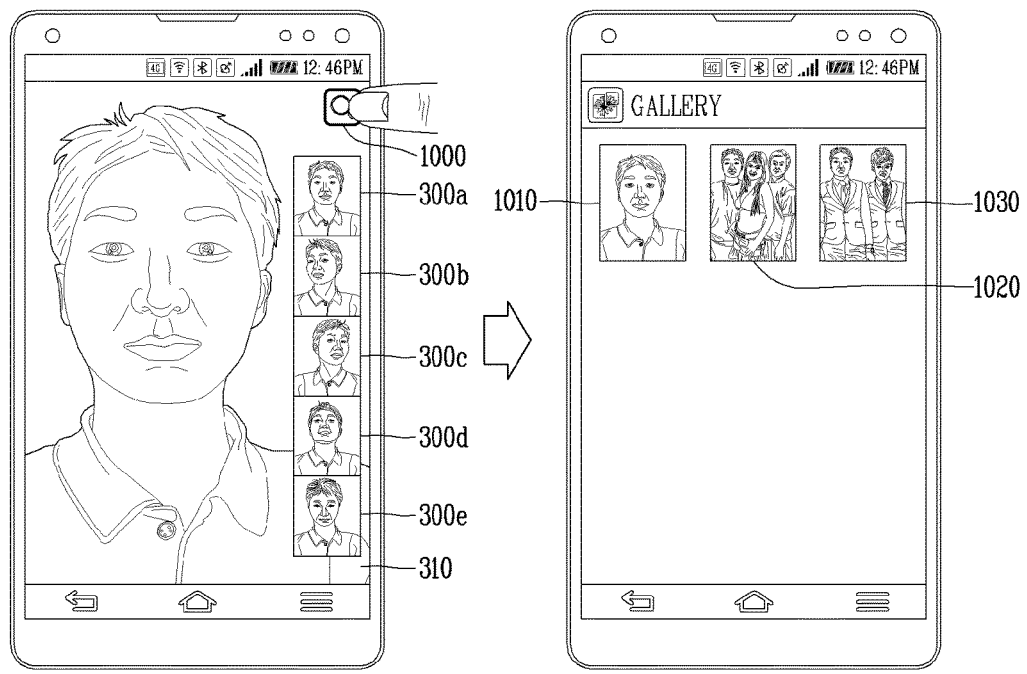

[Fig. 10b]
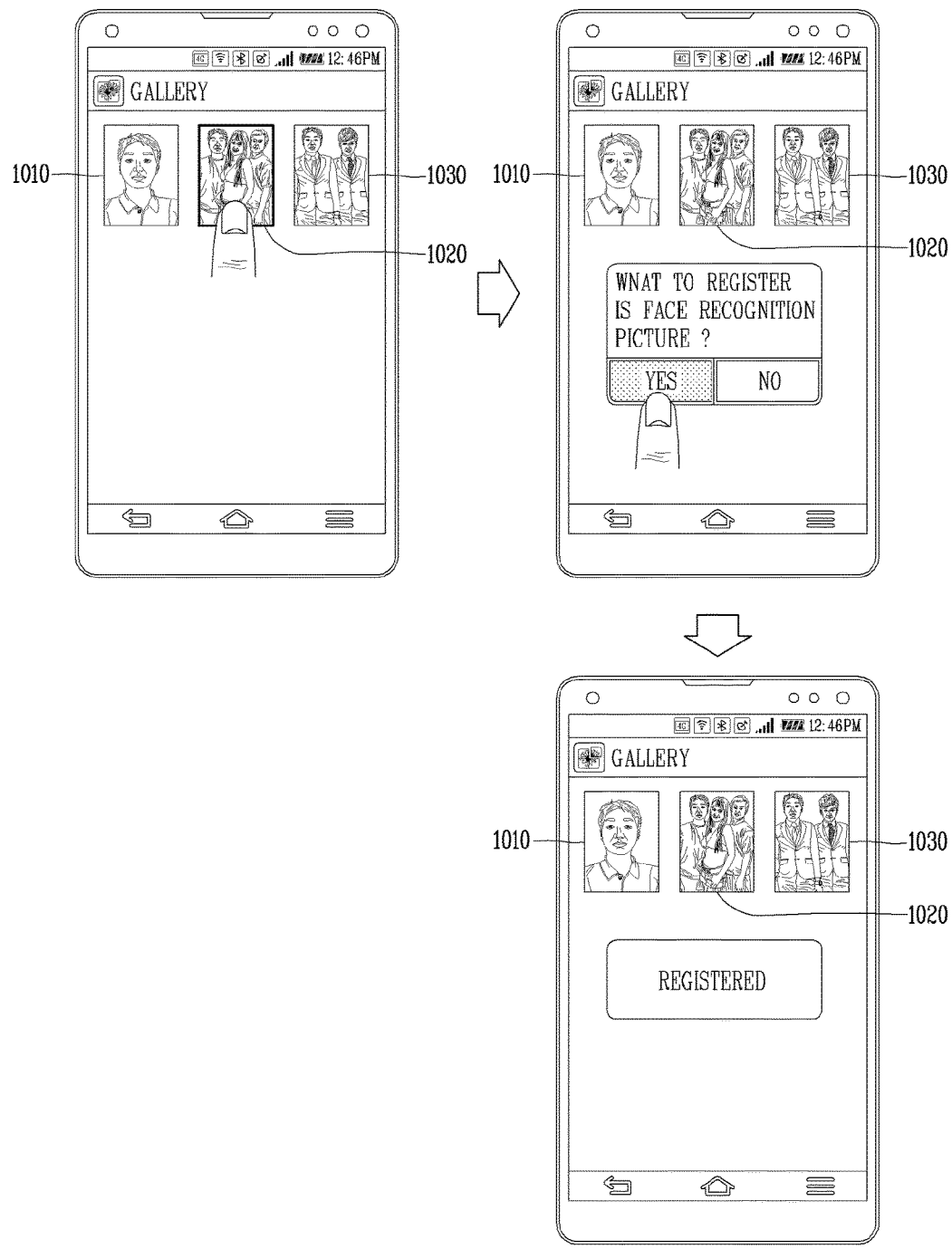

[Fig. 11a]
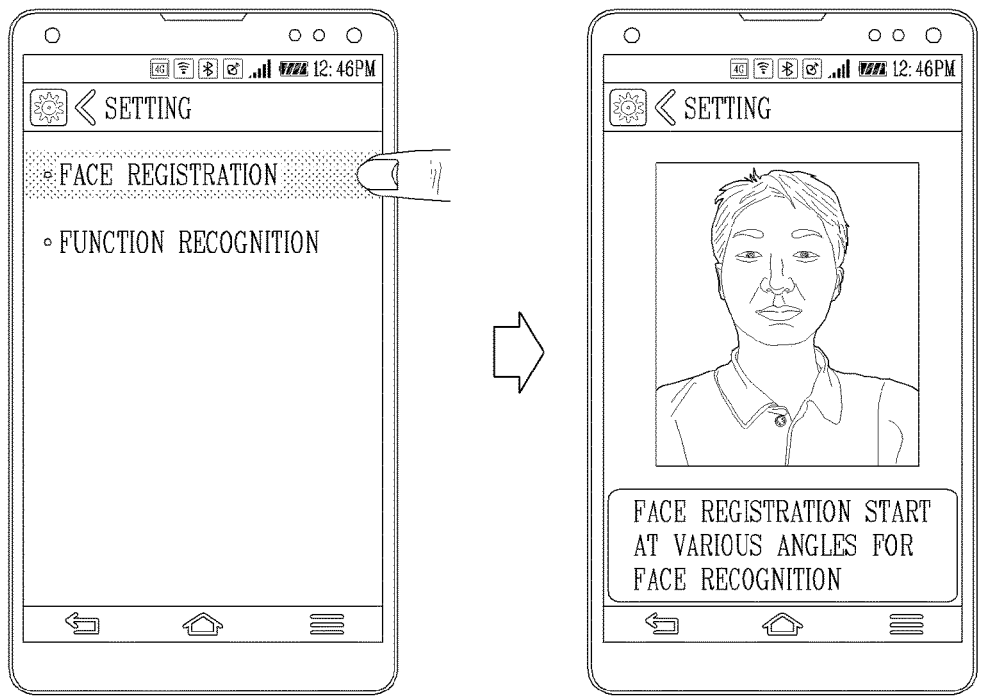
[Fig. 11b]
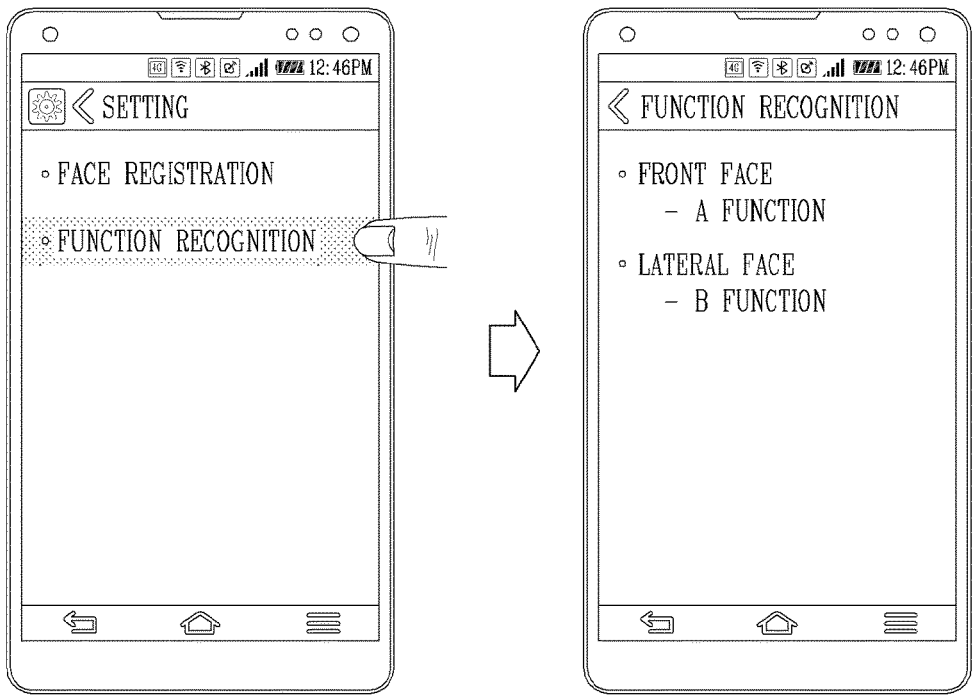

MOBILE TERMINAL AND CONTROL METHOD THEREOF

CROSS REFERENCE TO RELATED APPLICATIONS

This application is the National Phase of PCT/KR2015/007174 filed on Jul. 10, 2015, which claims priority under 35 U.S.C. § 119(a) to Patent Application No. 10-2014-0178773 filed in the Republic of Korea on Dec. 11, 2014, all of which are hereby expressly incorporated by reference into the present application.

TECHNICAL FIELD

The present disclosure relates to a mobile terminal related to a face recognition function and a control method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals are implemented in the form of a multimedia player including composite functions such as capturing images or video, reproducing music or video files, playing games, receiving broadcast signals, and the like.

In order to support and increase functions of terminals, improvement of structural parts and/or software parts of terminals may be taken into consideration.

Recently, biometric information of individuals of mobile terminals has been utilized in various manners. The biometric information may include face recognition, iris recognition, finger recognition, voice recognition, and the like.

Meanwhile, in order to execute various functions through biometric information, the necessity to develop a technique for accurately recognizing biometric information has been on the rise. In particular, face recognition, among biometric recognition, uses a non-contact method, and thus, accuracy of a recognition technique is required.

DISCLOSURE OF INVENTION

Technical Problem

Therefore, an aspect of the detailed description is to provide a method for increasing a face recognition rate.

Another aspect of the detailed description is to provide a method for allowing a user to easily recognize a face.

Another aspect of the detailed description is to provide various functions related to face recognition.

Solution to Problem

According to an aspect of the present invention, there is provided a method for

To achieve these and other advantages and in accordance with the purpose of this specification, as embodied and broadly described herein, a mobile terminal for providing screen information for face recognition may include: a camera unit configured to receive a face image; a display unit configured to output screen information for face recognition; and a control unit configure to, when face images captured in different postures are recognized, provide notification information indicating that the faces have been recognized, wherein the screen information for face recognition includes a plurality of graphic objects denoting face images of different postures, and when there is a posture identical to a posture of a face image received through the camera unit, among the postures denoted by the plurality of graphic objects, the control unit makes the graphic object denoting the posture identical to the posture of the face image received through the camera unit disappear from the screen information for face recognition.

In an exemplary embodiment of the present disclosure, when a posture of a face image received through the camera unit is identical to a posture denoted by any one graphic object among the plurality of graphic objects denoting the face images of different postures, the control unit may recognize the face image received through the camera unit.

In an exemplary embodiment of the present disclosure, the mobile terminal may further include: a memory unit configured to store a face image, wherein when a face image received through the camera unit is recognized, the control unit may store the recognized face image in the memory unit.

In an exemplary embodiment of the present disclosure, when a face image received through the camera unit is identical to any one face image among at least one face image stored in the memory unit, the control unit may execute a function associated with the any one face image.

In an exemplary embodiment of the present disclosure, in a locked state in which reception of a user's control command is limited, when a posture of a face I mage received through the camera unit is identical to a posture of a preset face image, the control unit may switch the locked state to an unlocked state in which reception of a user's control command is allowed.

In an exemplary embodiment of the present disclosure, when recognition order of face images of different postures sequentially received through the camera unit is identical to preset recognition order, the control unit may switch the locked state to an unlocked state.

In an exemplary embodiment of the present disclosure, when a face image received through the camera unit is recognized, the control unit may display the recognized face image in one region of screen information for face recognition.

In an exemplary embodiment of the present disclosure, the control unit may store the recognized face image in the memory unit.

In an exemplary embodiment of the present disclosure, in response to a preset type of touch applied to the recognized face image, the control unit may delete the recognized face image from the memory unit.

In an exemplary embodiment of the present disclosure, the control unit may output guide information for allowing the user recognize a face posture together on the screen information for face recognition.

In an exemplary embodiment of the present disclosure, the control unit may further detect a direction of the eyes of the face image received from the camera unit from the face image.

In an exemplary embodiment of the present disclosure, when the face posture and the direction of the eyes of the face image are identical to a preset posture and a preset direction of the eyes, the control unit may recognize the face image.

In an exemplary embodiment of the present disclosure, the mobile terminal may further include: a memory unit configured to store a plurality of images, wherein the control unit may detect at least one image associated with the recognized face image, from among the plurality of images stored in the memory unit.

In an exemplary embodiment of the present disclosure, the control unit may associate a particular function to the detected at least one image and the recognized face image.

In an exemplary embodiment of the present disclosure, when face images of different postures are recognized, the control unit may enter different modes in which different functions are accessible.

To achieve these and other advantages and in accordance with the purpose of this specification, as embodied and broadly described herein, a method for controlling a mobile terminal, may include: outputting screen information for recognizing a face image; displaying a face image received through a camera unit on the screen information for recognizing a face image; and when a posture of a face image received through the camera unit is identical to a posture of a preset face, recognizing the face image received through the camera unit, wherein the screen information for recognizing a face image includes a plurality of graphic objects denoting face images of different postures, and in the recognizing of a face image, making a graphic object denoting a face image of a posture identical to the posture of the face image received from the camera unit, among the plurality of graphic objects, disappear from the screen information for recognizing a face image.

In an exemplary embodiment of the present disclosure, in the recognizing of a face image, when a posture of a face image received through the camera unit is identical to a posture denoted by any one graphic object among the plurality of graphic objects denoting face images of different postures, the face image received through the camera unit may be recognized.

In an exemplary embodiment of the present disclosure, the method may further include: when the face is recognized, storing the recognized face image in a memory unit.

In an exemplary embodiment of the present disclosure, in the recognizing of a face image, a direction of the eyes of the face image received from the camera unit may be further detected from the face image.

In an exemplary embodiment of the present disclosure, the method may further include: when the face image is recognized, executing a function associated with the recognized face image.

Advantageous Effects of Invention

According to an exemplary embodiment of the present disclosure, since face images of different postures are recognized, a face recognition rate may increase.

Also, according to an exemplary embodiment of the present disclosure, a pattern may be formed through face images of various postures. Thus, in an exemplary embodiment of the present disclosure, various functions related to face recognition may be executed.

Also, various functions may be more conveniently executed through face recognition as a non-contact scheme.

BRIEF DESCRIPTION OF DRAWINGS

FIG. 1A is a block diagram of a mobile terminal according to an exemplary embodiment of the present disclosure.

FIGS. 1B and 1C are conceptual views of one example of the mobile terminal, viewed from different directions.

FIG. 2 is a flow chart illustrating method for registering a face image according to an exemplary embodiment of the present disclosure.

FIG. 3 is a conceptual view illustrating a control method of FIG. 2.

FIGS. 4A and 4B are conceptual views illustrating a method for providing various types of guide information to recognize face images in various postures.

FIGS. 5A and 5B are conceptual views illustrating a method for setting face postures as targets of recognition.

FIG. 6 is a conceptual view illustrating recognition of a face posture and a direction of the eyes of the face image in a mobile terminal according to an exemplary embodiment of the present disclosure.

FIGS. 7A, 7B, and 7C are conceptual views illustrating a method for providing information indicating that a face has been recognized on screen information for face recognition.

FIGS. 8A, 8B, 9A, and 9B are conceptual views illustrating a method for releasing a locked state through face images of different postures.

FIGS. 10A and 10B are conceptual views illustrating a method for detecting at least one image on the basis of a face image among images previously stored in the mobile terminal.

FIGS. 11A and 11B are conceptual views illustrating a method for receiving a user control command for face recognition and a method for setting a function associated with face recognition.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The shortrange communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, exemplary embodiments related to a control method that may be realized in the mobile terminal configured described above will be described with reference to the accompanying drawings. It will be obvious by a person skilled in the art that the present invention is embodied to any other forms without departing from the sprit and scope of the present invention.

Also, in the following descriptions, drawings are described in order of clockwise direction, starting from the drawing in an upper portion on the left.

The mobile terminal according to an exemplary embodiment of the present disclosure may recognize a face image received through a camera unit. Hereinafter, a control method for recognizing a face image for face recognition in the mobile terminal will be described.

Face recognition may refer to recognition of a face by comparing an image received from the camera unit 121 with a previously stored face image. Here, in recognizing a face, when a posture of a user face is changed, a face recognition rate may be drastically reduced. As a countermeasure, a method for recognizing a face by using face images representing various face postures has been disclosed.

The present disclosure proposes a method for registering face images in order to obtain face images in various postures. FIG. 2 is a flow chart illustrating method for registering a face image according to an exemplary embodiment of the present disclosure, and FIG. 3 is a conceptual view illustrating a control method of FIG. 2.

The mobile terminal according to an exemplary embodiment of the present disclosure may perform a step (S210) of outputting screen information for recognizing a face image may be output on a display unit.

The mobile terminal may include the camera unit 121, the display unit 151 for displaying screen information, and the control unit 180 for controlling the camera unit 121 and the display unit 151.

When a control command for recognizing a face image is received from the user, the control unit 180 may display screen information for recognizing a face image on the display unit 151.

The screen information recognizing a face image may include an image received through the camera unit 121, guide information for face recognition, a graphic object indicating an editing function of an image for face recognition, and the like.

For example, as illustrated in a first drawing of FIG. 3, the screen information for recognizing a face image may include an image 130 received through the camera unit 121 and guide information items 300*a*, 300*b*, 300*c*, 300*d*, and 300*e* for face recognition.

The guide information items 300*a*, 300*b*, 300*c*, 300*d*, and 300*e* may show different face postures. For example, any one guide information item among the guide information items 300*a*, 300*b*, 300*c*, 300*d*, and 300*e* may show a front face posture, and another guide information item may show a right lateral face posture with respect to a front face posture.

The number of the guide information items 300*a*, 300*b*, 300*c*, 300*d*, and 300*e* may be set by the user or may be set in advance. For example, the user may set the number of face postures to be recognized.

For example, the user may release the setting of the currently set postures of face recognition by applying a flicking input in a preset direction to the currently displayed guide information items 300*a*, 300*b*, 300*c*, 300*d*, and 300*e*.

For example, when the user applies the flicking input in the present direction to any one guide information item 300*a* among the guide information items 300*a*, 300*b*, 300*c*, 300*d*, and 300*e*, the control unit 180 may release setting of a face posture indicated by the any one guide information item 300*a*.

Also, a face posture for face recognition may be set by the user. For example, the user may set a front face, a left lateral face, and a low lateral face as postures for face recognition.

Also, in order to allow the user to directly set a face posture, the control unit 180 may display graphic objects associated with a face posture setting function on the display unit 151. The user may set face postures to be recognized in a sophisticated manner by using the graphic objects associated with the face posture setting function.

Also, together with the face recognition, the control unit 180 may extract a direction of the eyes from the face image. In this case, the control unit 180 may execute different functions on the basis of the face posture and the direction of the eyes of the face image.

When the face image is received, the mobile terminal according to an exemplary embodiment of the present disclosure may perform a step (S220) of determining whether a posture of the face image received from the camera unit 121 is identical to a posture of a preset face image.

For face recognition, the control unit 180 may receive an image from the camera unit 121. The image received from the camera unit 121 may be displayed on the display unit 151.

For face recognition, the control unit 180 may compare the face image received from the camera unit 121 with the previously stored face image. Here, in a case in which the posture of the face image received from the camera unit 121 is identical to the posture of the previously stored face image, the control unit 180 may recognize the face image received from the camera unit 121.

In a case in which the face image received from the camera unit 121 is not identical to the previously stored face image, the control unit 180 may not recognize the face image received from the camera unit 121.

Also, when recognizing the face image, the control unit 180 may detect a posture of the face image. Here, the control unit 180 may determine whether the posture of the face image is identical to a preset posture. For example, referring to the second drawing of FIG. 3, the control unit 180 may determine whether the image received from the camera unit 121 is identical to the right lateral face image. That is, the control unit 180 may recognize different face postures.

When the face image is identical to the previously stored face image, the mobile terminal according to an exemplary embodiment of the present disclosure may perform a step (S230) of recognizing the face image and providing notification information indicating that the face image has been recognized.

In a state in which the face image received through the camera unit 121 is output on the display unit 151, when the face image received through the camera unit 121 is identical to the previously stored face image, the control unit 180 may provide notification information indicating that the face has been recognized.

The notification information may be provided in at least one of visual, acoustic, and tactile manners. For example, the notification information may be provided in a visual manner.

In detail, the control unit 180 may make guide information indicating the recognized face posture among the guide information items 300a, 300b, 300c, 300d, and 300e displayed on the display unit 151 disappear from the display unit 151.

For example, referring to a third drawing of FIG. 3, in a case in which the right lateral face is recognized, the control unit may make the guide information 300c representing the right lateral surface among the guide information items 300a, 300b, 300c, 300d, and 300e disappear from the display unit 151.

In this manner, the user may recognize that the face postures represented by the guide information items being continuously output on the display unit 151 have not been recognized yet. Also, in an exemplary embodiment of the present disclosure, through the guide information items being continuously output on the display unit 151, the user may be induced to assume face postures represented by the remaining guide information items.

Also, when the face image is recognized, the control unit 180 may output a thumbnail image representing the recognized face image on the display unit 151. In this manner, in an exemplary embodiment of the present disclosure, information regarding a user's face image recognized in real time may be provided.

The thumbnail images may be output in regions different from those of the guide information items. Also, in a state in which the face image received from the camera unit 121 is output on the display unit 151, the thumbnail image may output to one region of the display unit 151. For example, in a state in which the face image received from the camera unit 121 is output in a central region of the display unit 151, the thumbnail image may be output to a lower region not covering the face image.

When the face image received from the camera unit 121 is recognized, the control unit 180 may store the recognized face image in the memory unit 170.

When the face image is recognized, the control unit 180 may execute a function associated with the recognition of the face image through the face image stored in the memory unit 170.

The function associated with the recognition of the face image may be a function related to an operation of the mobile terminal or a function related to an application installed in the mobile terminal. The function related to an operation of the mobile terminal may be an operation of turning off power of the mobile terminal, an operation of switching a locked state to an unlocked state, and a general operation performed in the mobile terminal.

Also, the function associated with recognition of the face image may be set by the user. For example, the user may associate a function for switching a locked state to an unlocked state to the front face image of the user. Here, when the face image is recognized, the control unit 180 may execute the function of switching the locked state to the unlocked state of the mobile terminal.

In this manner, in an exemplary embodiment of the present disclosure, various functions may be performed by using face images in different postures.

In addition, in order to strengthen security, the control unit 180 may require an additional control command together with recognition of a face image. For example, the additional control command may be a control command based on a blow (a puff of air) in a non-contact manner. In this manner, in an exemplary embodiment of the present disclosure, lowering of accuracy in face recognition may be supplemented.

Meanwhile, in a case in which the posture of the face image received from the camera unit 121 is not identical to the posture of the previously stored face images, the control unit 180 may not recognize the face image.

In the above, the method of recognizing face images in different postures by providing the guide information items has been described. Through this method, the user may recognize face images in various postures by intuition.

Hereinafter, a method for providing various types of guide information to recognize face images in various postures will be described in detail.

FIGS. 4A and 4B are conceptual views illustrating a method for providing various types of guide information to recognize face images in various postures.

When a user's control command for face recognition is received, the control unit 180 may output screen information for recognition of a face image on the display unit 151.

Also, in order to recognize a face image, the control unit 180 may activate the camera unit 121 and display an image received from the camera unit 121 on the display unit 151.

Here, the control unit 180 may provide guide information items to allow the user to assume various face postures. The guide information items may be face images 300a, 300b, 300c, 300d, and 300e in various postures.

Also, the guide information items may include text information related to the face postures. For example, as illustrated in a first drawing of FIG. 4A, a phrase 400 of "please gaze at the front", text information related to a face posture may be output on the display unit 151. Through this, the user may assume a face posture with reference to the phrase.

When the front face is recognized, the control unit 180 may make the front face image 300a among the face images 300a, 300b, 300c, 300d, and 300e disappear from the display unit 151. That is, by making the front face image 300a disappear, the control unit 180 may inform the user that there is no need to recognize the front face any longer.

Also, when the front face is recognized, the control unit 180 may output text information related to a different face posture on the display unit 151 such that the user may assume a different posture. For example, as illustrated in a second drawing of FIG. 4A, the control unit 180 may output a phrase 410 "Please turn your head to the left at 45 degrees". In this case, with reference to the phrase, the user may turn his head in a leftward direction to assume a face posture.

When a left lateral face is recognized, the control unit 180 may make the face image 300c representing the left lateral face disappear from the display unit 151 in the same manner as described above.

In addition, the control unit 180 may continuously output text information 430 related to the face posture (for example, "Please turn your head to the right at 45 degrees") until recognition of a face posture to be recognize is completed.

Also, the control unit 180 may execute various functions related to the face images 300a, 300b, 300c, 300d, and 300e through various types of touches with respect to the face images 300a, 300b, 300c, 300d, and 300e.

That is, although not shown, the control unit 180 may add, delete, or change the face images by applying a preset type of touch to the face images 300a, 300b, 300c, 300d, and 300e.

For example, when a long touch is applied to any one face image 300 among the face images 300a, 300b, 300c, 300d, and 300e, the control unit 180 may execute a function to re-capture a face posture represented by the any one face image 300a.

Meanwhile, unlike the text information, the control unit 180 may output a graphic object in the form of an arrow indicating intuitive information regarding a face direction. For example, as illustrated in a first drawing of FIG. 4B, the control unit 180 may output a graphic object 420 in the form of an arrow indicating the face image in an overlapping manner on the face image received from the camera unit 121.

Here, the control unit 180 may detect a face direction of the face image received from the camera unit 121 in real time. Also, the control unit 180 may display the graphic object 420 in the form of the arrow such that it is identical to the face direction of the face image received from the camera unit 121 in real time.

For example, as illustrated in a second drawing of FIG. 4B, when the face direction of the face image received from the camera unit 121 is changed, the control unit 180 may control the graphic object 420 in the arrow form such that the graphic object 420 indicates the changed direction.

That is, through the graphic object in the arrow form, the user may recognize the current direction of his or her face, and may be provided with information regarding how he or she assumes a posture.

In the above, the method for providing various types of guide information when faces in various postures are registered has been described.

Hereinafter, a method for setting a face posture to be recognized will be described.

FIGS. 5A and 5B are conceptual views illustrating a method for setting face postures as targets of recognition.

The mobile terminal according to an exemplary embodiment of the present disclosure may recognize various face postures. Here, the face postures to be recognized may be set the user.

To this end, in response to a user request for setting a face posture, the control unit 180 may output screen information for setting a face posture to the display unit 151.

Various graphic objects related to face postures may be output on the screen information for setting face postures.

For example, as illustrated in a first drawing of FIG. 5A, graphic objects 500a and 500b for changing a face image and a face posture may be displayed on the display unit 151. Here, the graphic objects 500a and 500b may have various shapes. For example, the graphic objects 500a and 500b may have a bar shape.

Meanwhile, the user may change a face posture by using the bar-shaped graphic objects 500a and 500b. For example, as illustrated in first and second drawings of FIG. 5A, the user may determine a leftwardly and rightwardly rotated face posture on the basis of a touch applied to any one graphic object 500a among the graphic objects 500a and 500b.

Here, the control unit 180 may determine a degree to which the face moves leftwardly or rightwardly. For example, as illustrated in the second and third drawings of FIG. 5A, the control unit 180 may determine a degree to which the face posture rotates on the basis of a drag input applied to anyone graphic object 500.

In another example, as illustrated in the first drawing of FIG. 5B, the control unit 180 may determine a degree to which the face image moves up and down on the basis of a touch applied to the other graphic object 500b.

Here, as illustrated in the second and third drawings of FIG. 5B, the control unit 180 may determine a degree to which the face image moves up and down on the basis of the other graphic object 500b.

Meanwhile, although not shown, the user may select at least one among the plurality of preset face postures. In this case, the control unit 180 may provide a face posture list including items indicating the plurality of preset face postures to the user.

In the above, the method for setting a face posture as a target for face recognition has been described. In this manner, the user may set various types of face postures and utilize the same.

Hereinafter, a method for recognizing a direction of the eyes of a face image together in recognizing a face will be described.

FIG. 6 is a conceptual view illustrating recognition of a face posture and a direction of the eyes of a face image in a mobile terminal according to an exemplary embodiment of the present disclosure.

In a face image received from the camera unit 121, the control unit 180 may further detect a direction of the eyes of the face image. That is, the control unit 180 may detect a direction of the eyes of the face image together from the received face image through an image analysis.

Here, the control unit 180 may set a face posture to be recognized, as a combination of a direction of the face image and a direction of the eyes of the face image. For example, as illustrated in FIG. 6, on the basis of the left lateral face and the downward direction of the eyes of the face image, the control unit 180 may form one face posture.

In this case, the control unit 180 may perform different functions according to various face postures on the basis of the face direction and the direction of the eyes of the face image. For example, when the front face direction and the downward direction of the eyes of the face image are detected, the control unit 180 may execute a first function associated with the front face direction and the downward direction of the eyes of the face image, and when the front face direction and an upward direction of the eyes of the face image are sensed, the control unit 180 may execute a second function associated with the front face direction and the upward direction of the eyes of the face image.

Here, the function executed on the basis of the face direction and the direction of the eyes of the face image may be a function related to a function related to an operation of the mobile terminal or a function related to an application installed in the mobile terminal.

Also, the function executed on the basis of the face direction and the direction of the eyes of the face image may be set by the user or may be set in advance when the mobile terminal is initially released. For example, the first function may be a function to execute a Web browser and the second function may be a camera function.

In the above, the method for generating various face postures including a direction of the eyes of the face image has been described.

Hereinafter, a method for providing a recognized face to the user when the face is recognized on screen information for face recognition will be described.

FIGS. 7A, 7B, and 7C are conceptual views illustrating a method for providing information indicating that a face has been recognized on screen information for face recognition.

In a state in which screen information for face recognition is output, the control unit 180 may recognize a face image identical to any one posture among a plurality of previously stored face postures.

Here, in order to inform the user in which form the face image has been recognized, the control unit 180 may output a thumbnail image representing the recognized face image on the display unit 151.

The thumbnail image is a reduced image of a target image such that the target image may be visible at a glance.

The thumbnail image may be output together with the screen information for face recognition. For example, as illustrated in first and second drawings of FIG. 7A, when a front face is recognized, the control unit 180 may output a thumbnail image 700a representing the front face image on the screen information for face recognition.

Accordingly, the user may directly recognize a shape of the currently recognized face image.

Also, when a preset type of touch is applied to the thumbnail image, the control unit 180 may execute a function related to the thumbnail image.

The function related to the thumbnail image may be a function to delete the face image represented by the thumbnail image from the memory unit 170, a function to move the thumbnail image, and the like.

For example, as illustrated in a first drawing of FIG. 7B, a plurality of thumbnail images 700a, 700b, 700c, and 700d representing the recognized face images may be output on the display unit 151.

Here, the user may select at least one among the plurality of thumbnail images 700a, 700b, 700c, and 700d, as a face image for face recognition. For example, the control unit 180 may select at least one thumbnail image 700a and 700c to which a touch has been applied, among the plurality of thumbnail images 700a, 700b, 700c, and 700d, as a face image for face recognition.

Here, the control unit 180 may store the face images represented by the selected thumbnail images 700a and 700c in the memory unit 170.

Also, as illustrated in first and second drawings of FIG. 7C, in response to a preset type of touch applied to any one thumbnail image 700a among the plurality of thumbnail images 700a, 700b, 700c, and 700d, the control unit 180 may make a face image represented by the any one thumbnail image 700a disappear from the display unit 151. Here, the control unit 180 may image again a posture of the face image represented by the thumbnail image 700a to which the preset type of touch has been applied.

In the above, the method for outputting a thumbnail image representing a recognized face image during face recognition has been described. In this manner, in an exemplary embodiment of the present disclosure, various controlling related to face recognition together with face recognition may be performed by using a thumbnail image representing a recognized face image.

Hereinafter, a method for releasing a locked state through face images of different postures will be described.

FIGS. 8A, 8B, 9A, and 9B are conceptual views illustrating a method for releasing a locked state through face images of different postures.

The mobile terminal according to an exemplary embodiment of the present disclosure may be in any one state among a locked state in which reception of a user's control command is limited and an unlocked state in which reception of a user's control command can be received.

When the mobile terminal is in the locked state, the control unit 180 may display a lock screen indicating the locked state on the display unit 151. The lock screen may include screen information for receiving a user input for releasing the locked state.

As the user input for releasing the locked state, various types of inputs such as a password input, a pattern input, a fingerprint input, a face image input, and the like, may be used. For example, as illustrated in FIG. 8A, when a face image is recognized, the control unit 180 may switch the locked state to an unlocked state.

In detail, when a face image identical to any one image, among previously stored face images of different postures, is received, the control unit 180 may switch the locked state to the unlocked state.

When the unlocked state is entered, the control unit 180 may output a home screen page on the display unit 151. The home screen page is screen information in a standby state (or an idle state) of the mobile terminal, including an icon and a widget denoting applications installed in the mobile terminal.

Meanwhile, the control unit 180 may sequentially recognize face images of different postures, and when order of the sequentially recognized face images is identical to preset order, the control unit 180 may switch the locked state to the unlocked state.

In detail, the control unit 180 may set a face image of a first posture, a face image of a second posture, and a face image of a third posture to one pattern, and when the face images of the first posture, the second posture, and the third posture are sequentially recognized in the locked state, the control unit 180 may switch the locked state to the unlocked state. Here, the pattern using the face postures may be set by the user in advance.

For example, as illustrated in first and second drawings of FIG. 8B, the control unit 180 may sequentially recognize a left lateral face image and a right lateral face image in the locked state.

When the sequentially recognized face images are identical to preset order, the control unit 180 may switch the locked state to the unlocked state. Here, as illustrated in a third drawing of FIG. 8B, the control unit 180 may output a home screen page on the display unit 151.

Meanwhile, when faces of different postures are recognized, the control unit 180 may enter a state in which different functions are accessible. That is, when the face image of the first posture is recognized, the control unit 180 may enter the first state in which first functions may be executed, and when the face image of the second posture is recognized, the control unit 180 may enter the second state in which second functions may be executed.

The first state and the second state may be states in which accessible functions are different.

The first state may be a state in which a general application not related to personal information is accessible. That is, the first state may be a state in which functions not related to personal information such as the Internet, a game, an alarm, and the like, are accessible. For example, as illustrated in FIG. 9A, when the front face is recognized in the locked state, the control unit 180 may enter the first state.

Also, the second state may be a state in which a function related to personal information is accessible. For example, the second state may be a state in which functions related to personal information such as a bank, a gallery, a schedule, and the like, are accessible. That is, in an exemplary embodiment of the present disclosure, different functions may be accessed according to face postures, and thus, various functions may be provided to the user. For example, as illustrated in FIG. 9B, when a left lateral face is recognized in the locked state, the control unit 180 may enter the second state.

Also, although not shown, the control unit 180 may access different states according to patterns using face postures. For example, when face images are recognized in order of the first posture and the second posture, the control unit 180 may enter the first state, and when the face images are recognized in order of the second posture and the first posture, the control unit 180 may enter the second state.

In the above, the method for switching the locked state to the unlocked state by using the face images of different postures has been described. In this manner, in an exemplary embodiment of the present disclosure, the locked state may be switched to the unlocked state in various manners through the face images of different postures.

Hereinafter, a method for detecting an additional face image on the basis of face images having different postures will be described.

FIGS. 10A and 10B are conceptual views illustrating a method for detecting at least one image on the basis of a face image among images previously stored in the mobile terminal.

The control unit 180 may detect at least some of a plurality of images previously stored in the memory unit 170 on the basis of a recognized face image. The at least some detected images may be images determined to include a person the same as that of the recognized face image.

In detail, the control unit 180 may detect at least one image having similarity to that of the recognized face image by a level equal to or higher than a preset level, from among a plurality of images stored in the memory unit 170, by using an image analysis algorithm. As the image analysis algorithm, various schemes widely known to a person skilled in the art may be used.

For example, as illustrated in a first drawing of FIG. 10A, a graphic object 1000 denoting a function to detect a recognized face image and a similar image by using the recognized face image may be included on screen information for face recognition.

Here, in response to a touch applied to the graphic object 1000 denoting the function to detect a similar image using the recognized face image, the control unit 180 may detect at least one image similar to the recognized face image from among the plurality of images stored in the memory unit 170.

Here, as illustrated in a second drawing of FIG. 10A, the control unit 180 may output at least one detected image 1010, 1020, and 1030 on the display unit 151.

Here, as for the at least one image 1010, 1020, and 1030, images including accessories (for example, a hat, glasses, and the like) hindering face recognition may be additionally used for face recognition, thus increasing a face recognition rate.

The control unit 180 may associate an image selected by the user from among the at least one detected image 1010, 1020, and 1030 with the recognized face image and store the same. That is, the control unit 180 may utilize the image selected by the user from among the at least one image 1010, 1020, and 1030 in recognizing the face image.

For example, as illustrated in first and second drawings of FIG. 10B, the control unit 180 may set the selected image 1020 as an image to be used for face recognition. In this case, the control unit 180 may output a pop-up window inquiring as to whether the selected image 1020 is to be used as a face recognition image on the display unit 151. Here, when a control command to use the selected image 1020 as a face recognition image is received, the control unit 180 may use the selected image 1020 as a face recognition image.

In the above, the method for using images previously stored in the memory unit as a face recognition image has been described.

In this manner, the user may select at least some images from among a plurality of images detected by using the image analysis algorithm and set the same as face recognition images.

Hereinafter, a method for receiving a user control command for face recognition and a method for setting a function associated with face recognition will be described.

FIGS. 11A and 11B are conceptual views illustrating a method for receiving a user control command for face recognition and a method for setting a function associated with face recognition.

The mobile terminal according to an exemplary embodiment of the present disclosure may execute a face registration function for face recognition when initialized in a factory. In this case, the mobile terminal may have an advantage of recognizing a face seen in the most natural posture that the user holds the mobile terminal.

Also, the mobile terminal may execute the face registration function through an environment setting function related to an operation of the mobile terminal while the mobile terminal is in use. The environment setting function may be a function for the user to select a setting related to a general operation of the mobile terminal such as registration of a background image, adjustment of a volume, adjustment of brightness of a display unit, and the like.

For example, as illustrated in a first drawing of FIG. 11A, when the environment setting function is executed, a setting list including items for setting a face registration function and a function to be associated with a registered face may be output on the display unit 151.

Here, when the face registration function is selected according to a user request, the control unit 180 may output screen information for registering a face on the display unit 151.

Also, after the face is registered, the control unit 180 may execute a function to register a function to be associated with the registered face according to a user request. For example, as illustrated in FIG. 11B, the control unit may provide screen information for registering different functions in face images of different postures.

Accordingly, the user may execute different functions in each of face postures.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal for providing screen information for face recognition, the mobile terminal comprising:
   a camera unit configured to receive a face image;
   a display unit configured to output screen information for face recognition; and
   a control unit configured to, when face images captured in different postures are recognized, provide notification information indicating that the faces have been recognized,
   wherein the screen information for face recognition includes a plurality of graphic objects denoting face images of different postures, and
   when there is a posture identical to a posture of a face image received through the camera unit, among the postures denoted by the plurality of graphic objects, the control unit makes the graphic object denoting the posture identical to the posture of the face image received through the camera unit, disappear from the screen information for face recognition.

2. The mobile terminal of claim 1, wherein when the posture of the face image received through the camera unit is identical to a posture denoted by any one graphic object among the plurality of graphic objects denoting the face images of different postures, the control unit recognizes the face image received through the camera unit.

3. The mobile terminal of claim 2, further comprising:
   a memory unit configured to store the face image,
   wherein when a face image received through the camera unit is recognized, the control unit stores the recognized face image in the memory unit.

4. The mobile terminal of claim 3, wherein when the face image received through the camera unit is identical to any one face image among at least one face image stored in the memory unit, the control unit executes a function associated with the any one face image.

5. The mobile terminal of claim 4, wherein when the posture of the face image received through the camera unit is identical to a posture of a preset face image in a locked state, the control unit switches the locked state to an unlocked state in which reception of a user's control command is allowed.

6. The mobile terminal of claim 5, wherein, when a recognition order of face images of different postures sequentially received through the camera unit is identical to a preset recognition order, the control unit switches the locked state to an unlocked state.

7. The mobile terminal of claim 1, wherein when the face image received through the camera unit is recognized, the control unit displays the recognized face image in one region of screen information for face recognition.

8. The mobile terminal of claim 7, wherein the control unit stores the recognized face image in a memory unit.

9. The mobile terminal of claim 8, wherein in response to a preset type of a touch applied to the recognized face image, the control unit deletes the recognized face image from the memory unit.

10. The mobile terminal of claim 1, wherein the control unit outputs guide information for allowing a user to recognize a face posture together on the screen information for face recognition.

11. The mobile terminal of claim 1, wherein the control unit further detects a direction of eyes of the face image received from the camera unit from the received face image.

12. The mobile terminal of claim 11, wherein when the face posture and the direction of the eyes of the received face image are identical to a preset posture and a preset direction of the eyes, the control unit recognizes the face image.

13. The mobile terminal of claim 1, further comprising:
    a memory unit configured to store a plurality of images,
    wherein the control unit detects at least one image associated with the recognized face image, from among the plurality of images stored in the memory unit.

14. The mobile terminal of claim 13, wherein the control unit associates a particular function to the detected at least one image and the recognized face image.

15. The mobile terminal of claim 1, wherein when face images of different postures are recognized, the control unit enters different modes in which different functions are accessible.

16. A method for controlling a mobile terminal, the method comprising:
    outputting screen information for recognizing a face image;
    displaying a face image received through a camera unit on the screen information for recognizing the face image; and when a posture of a face image received through the camera unit is identical to a posture of a preset face, recognizing the face image received through the camera unit, wherein the screen information for recognizing the face image includes a plurality of graphic objects denoting face images of different postures, and in the recognizing of the face image, a graphic object denoting a face image of a posture identical to the posture of the face image received from the camera unit, among the plurality of graphic objects, is made to disappear from the screen information for recognizing the face image.

17. The method of claim 16, wherein, in the recognizing of the face image, when the posture of the face image received through the camera unit is identical to a posture denoted by any one graphic object among the plurality of graphic objects denoting face images of different postures, the face image received through the camera unit is recognized.

18. The method of claim 17, further comprising:
when the face is recognized, storing the recognized face image in a memory unit.

19. The method of claim 16, wherein, in the recognizing of the face image, a direction of eyes of the face image received from the camera unit is further detected from the received face image.

20. The method of claim 19, further comprising:
when the face image is recognized, executing a function associated with the recognized face image.

* * * * *